United States Patent [19]
Petrunka et al.

[11] Patent Number: 6,122,364
[45] Date of Patent: Sep. 19, 2000

[54] INTERNET NETWORK CALL CENTER

[75] Inventors: Robert W. Petrunka; Patrick J. Dagert, both of Raleigh, N.C.

[73] Assignee: Nortel Networks Corporation, Montreal, Canada

[21] Appl. No.: 08/982,471

[22] Filed: Dec. 2, 1997

[51] Int. Cl.$^7$ .......................... H04M 3/523; H04M 11/00; H04M 7/00; H04L 12/66
[52] U.S. Cl. ...................... 379/265; 370/353; 379/93.23; 379/220; 379/900
[58] Field of Search ...................................... 379/265, 266, 379/309, 219, 220, 221, 93.17, 93.23, 142, 100.15, 100.16, 900; 370/352, 353, 354, 355, 356

[56] References Cited

U.S. PATENT DOCUMENTS

| | | | |
|---|---|---|---|
| 4,048,452 | 9/1977 | Oehring et al. | 179/27 |
| 4,289,934 | 9/1981 | Pitroda et al. | 179/27 |

(List continued on next page.)

FOREIGN PATENT DOCUMENTS

| | | |
|---|---|---|
| 0 539 104 A2 | 4/1993 | European Pat. Off. . |
| 0 545 226A | 6/1993 | European Pat. Off. . |
| 0 647 051 A1 | 9/1994 | European Pat. Off. . |
| 0 622 938 A2 | 11/1994 | European Pat. Off. . |
| 0 710 042 A2 | 5/1996 | European Pat. Off. . |
| 0 753 956A | 1/1997 | European Pat. Off. . |
| 0 802 665 A2 | 10/1997 | European Pat. Off. . |
| WO 98/01987 | 1/1998 | European Pat. Off. . |
| 2 298 761 | 9/1996 | United Kingdom . |
| WO 94/00945A | 1/1994 | WIPO . |

OTHER PUBLICATIONS

V/IP Applications Guide, "Complete Voice and Fax Integration Over IP Networks," pp. 1–2, Jun. 1997, HTTP://www.micom.com/product/vip/cov.html.

V/IP Applications Guide, "How V/IP Works," pp. 1–4, Jun. 1997, HTTP://www.micom.com/product/vip/how.html.

V/IP Applications Guide, "The MICOM V/IP Phone/Fax IP Gateway," pp. 1–4, Jun. 1997, HTTP://www.micom.com/product/vip/micom vip.html.

V/IP Applications Guide, "V/IP Applications," pp. 1–3, Jun. 1997, HTTP://www.micom.com/product/vip/application.html.

V/IP Applications Guide, "Putting It All Together," pp. 1–6, Jun. 1997, HTTP://www.micom.com/product/vip/together.html.

Giordano et al., "PCS Number Portability", IEEE/ICCC, pp. 1146–1150, 1994.

Japanese Patent Abstract Publication No. 07170288, dated Jul. 4, 1995.

Harvey, D.E., et al. "Call Center Solutions," AT&T Technical Journal, vol. 70, No. 5, Sep. 1, 1991, pp. 36–44.

*Primary Examiner*—Harry S. Hong
*Attorney, Agent, or Firm*—Finnegan, Henderson, Farabow, Garrett & Dunner

[57] ABSTRACT

A call servicing system permits service agents to service customer calls over a data network. The call servicing system includes customer switches that direct calls to and from the customers, agent terminals for use by the service agents in servicing the customer calls, a network switch, a call translation unit, and an Automatic Call Distribution (ACD) server. The network switch receives the customer calls and transfers the calls to the call translation unit under direction of the ACD server. The call translation unit routes the calls to selected service agents. The ACD server selects the service agents to service the calls, and controls the call translation unit to forward the calls to the agent terminals associated with the selected service agents over the data network.

23 Claims, 5 Drawing Sheets

U.S. PATENT DOCUMENTS

| | | | |
|---|---|---|---|
| 4,466,098 | 8/1984 | Southard | 371/9 |
| 4,674,036 | 6/1987 | Conforti | 364/200 |
| 4,700,381 | 10/1987 | Eher | 379/279 |
| 4,737,983 | 4/1988 | Frauenthal et al. | 379/221 |
| 4,755,995 | 7/1988 | Anderson et al. | 371/9 |
| 4,866,763 | 9/1989 | Cooper et al. | 379/221 |
| 4,881,261 | 11/1989 | Oliphant et al. | 379/215 |
| 4,893,301 | 1/1990 | Andrews et al. | 370/58.2 |
| 4,951,310 | 8/1990 | Honda et al. | 379/266 |
| 4,988,209 | 1/1991 | Davidson et al. | 370/58.2 |
| 5,023,868 | 6/1991 | Davidson et al. | 370/62 |
| 5,031,211 | 7/1991 | Nagai et al. | 379/221 |
| 5,036,535 | 7/1991 | Gechter et al. | 379/210 |
| 5,062,103 | 10/1991 | Davidson et al. | 370/58.1 |
| 5,073,890 | 12/1991 | Danielsen | 370/58.2 |
| 5,113,430 | 5/1992 | Richardson, Jr. et al. | 379/88 |
| 5,153,909 | 10/1992 | Beckle et al. | 379/265 |
| 5,175,866 | 12/1992 | Childress et al. | 455/8 |
| 5,193,110 | 3/1993 | Jones et al. | 379/94 |
| 5,214,688 | 5/1993 | Szlam et al. | 379/67 |
| 5,271,058 | 12/1993 | Andrews et al. | 379/210 |
| 5,291,492 | 3/1994 | Andrews et al. | 370/110.1 |
| 5,291,550 | 3/1994 | Levy et al. | 379/242 |
| 5,291,551 | 3/1994 | Conn et al. | 379/265 |
| 5,309,505 | 5/1994 | Szlam et al. | 379/88 |
| 5,309,513 | 5/1994 | Rose | 379/265 |
| 5,317,627 | 5/1994 | Richardson, Jr. et al. | 379/88 |
| 5,335,268 | 8/1994 | Kelly, Jr. et al. | 379/112 |
| 5,335,269 | 8/1994 | Steinlicht | 379/266 |
| 5,341,374 | 8/1994 | Lewen et al. | 370/85.4 |
| 5,353,339 | 10/1994 | Scobee | 379/207 |
| 5,355,403 | 10/1994 | Richardson, Jr. et al. | 379/88 |
| 5,392,345 | 2/1995 | Otto | 379/265 |
| 5,392,346 | 2/1995 | Hassler et al. | 379/265 |
| 5,402,474 | 3/1995 | Miller et al. | 379/93 |
| 5,404,350 | 4/1995 | DeVito et al. | 370/16 |
| 5,450,482 | 9/1995 | Chen et al. | 379/207 |
| 5,452,350 | 9/1995 | Reynolds et al. | 379/220 |
| 5,459,780 | 10/1995 | Sand | 379/265 |
| 5,526,353 | 6/1996 | Henley et al. | 370/60.1 |
| 5,546,452 | 8/1996 | Andrews et al. | 379/219 |
| 5,608,786 | 3/1997 | Gordon | 379/100.08 |
| 5,633,924 | 5/1997 | Kaish et al. | 379/265 |
| 5,684,870 | 11/1997 | Maloney et al. | 379/265 |
| 5,724,412 | 3/1998 | Srinivasan | 379/142 |
| 5,778,060 | 7/1998 | Otto | 379/265 |
| 5,841,854 | 11/1998 | Schumacher et al. | 379/265 |
| 5,848,143 | 12/1998 | Andrews et al. | 379/207 |
| 5,878,130 | 3/1999 | Andrews et al. | 379/265 |
| 5,889,774 | 3/1999 | Mirashrafi et al. | 379/100.15 |
| 5,940,497 | 8/1999 | Miloslavsky | 379/220 |

INTERNET NETWORK CALL CENTER

RELATED APPLICATIONS

This application is a continuation-in-part of U.S. patent application Ser. No. 08/760,111, filed Dec. 3, 1996, and related to U.S. patent applications Ser. Nos. 08/833,990 and 08/833,997, both filed Apr. 11, 1997, and U.S. patent application Ser. No. 08/982,501, filed concurrently herewith, all of which are incorporated by reference.

BACKGROUND OF THE INVENTION

The present invention relates generally to a call management system and more particularly to a network in which remote agents connect over a data network, such as the Internet, to service customer calls.

Many businesses use agents or operators to service customers by telephone. These businesses often employ several agents connected to an Automatic Call Distribution (ACD) system, such as a Meridian® ACD manufactured by Northern Telecom, Ltd., to handle multiple calls simultaneously. The call center technology distributes the calls (usually dialed with a toll-free number) to the agents.

There are three principal types of call center technology: standalone ACDs, ACDs integrated with a Private Branch Exchange (PBX), and central office based ACDs. The most commonly used type is the ACD integrated with a PBX.

Conventional call centers require agents to have a direct line connection to a local ACD. The ACD handles the routing of calls to the agents and provides management and reporting functions. The direct line connection, however, limits the distance from the local ACD agents could locate.

Because many businesses want to be able to locate their agents at various locations, even ones remote from an ACD, some conventional call centers have technology to permit remote access. These conventional call centers require, in addition to a voice path, a data path to exist between the remote agent's location and the local ACD to report status changes, such as logging on, logging off, and agent availability.

Some call centers use an Integrated Services Digital Network (ISDN) line as the data path from the local ACD to the remote agent's location, while others use a second standard telephone line as the data path. Still other centers use special circuitry to permanently monitor dual tone multi-frequency (DTMF) tones on a standard telephone line of the remote agent. This special circuitry effectively provides the data path to the local ACD through which the remote agent reports status changes.

To provide this reporting functionality, these conventional call centers add significant costs to the remote agent function by requiring an additional data path or special circuitry. Additionally, establishing the data path from the remote agent location to a local, centralized ACD can be complex and difficult to achieve, further limiting the economic viability of the remote agent concept.

SUMMARY OF THE INVENTION

Systems and methods consistent with the principles of the present invention address this problem by permitting remote agents to connect over a data network, such as the Internet, thereby permitting agents to locate anywhere and eliminating the requirement for an additional data path, special circuitry, or a connection to a local ACD.

In accordance with the purposes of the invention as embodied and broadly described herein, a call servicing system consistent with the principles of the present invention comprises customer switches that direct calls to and from customers, agent terminals for use by service agents in servicing the customer calls, a network switch, a call translation unit, and an Automatic Call Distribution (ACD) server. The network switch receives the customer calls and transfers the calls to the call translation unit under direction of the ACD server. The call translation unit routes the calls to selected service agents over a data network. The ACD server selects the service agents to service the calls, and controls the call translation unit to forward the calls to the agent terminals associated with the selected service agents over the data network.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the principles of the present invention reduce customer service costs and facilitate remote agent servicing by permitting a remote agent at any physical location to service customer calls through a data network, such as the Internet, using a standard telephone line.

I. Network Elements.

Figure 1:
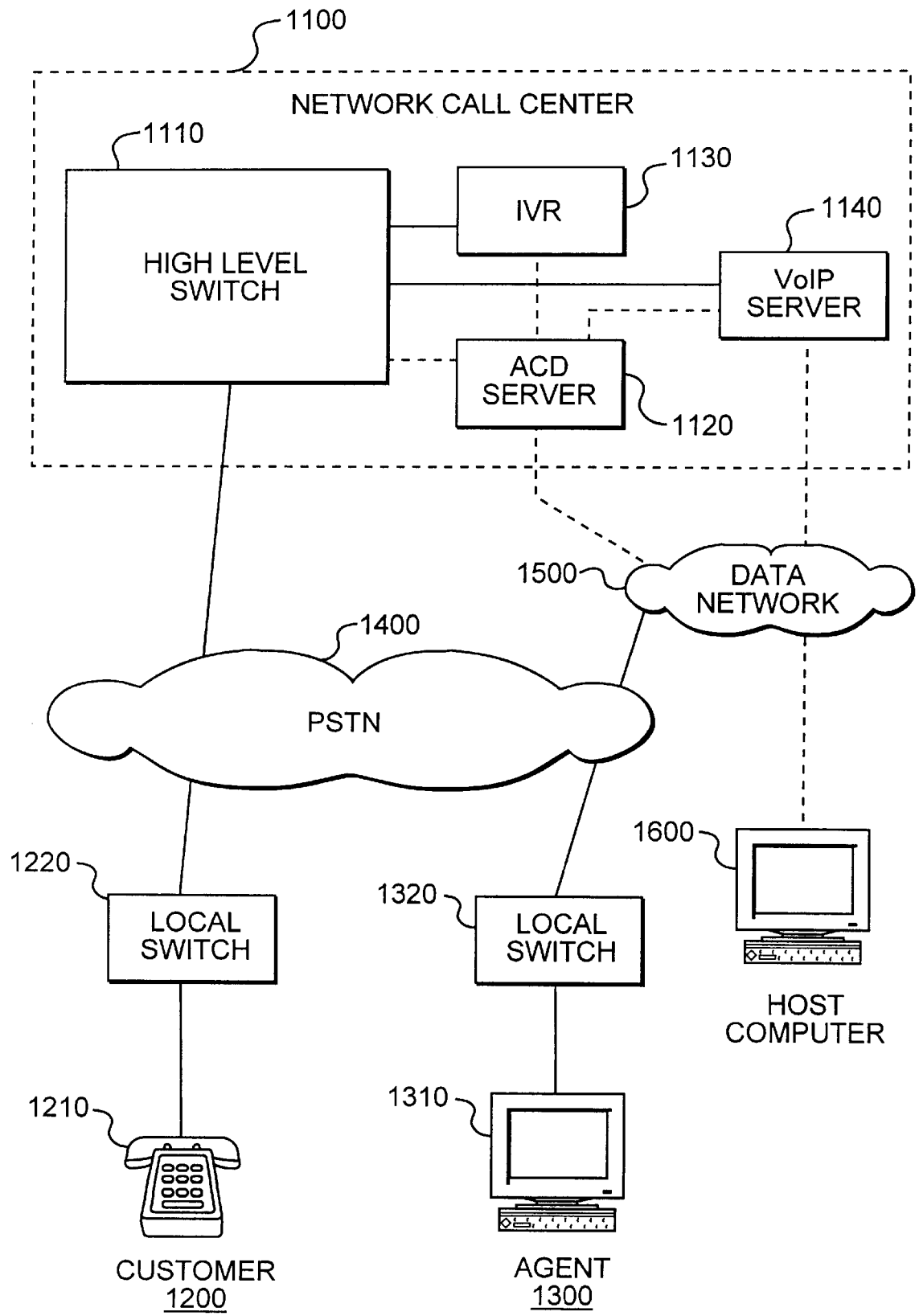
FIG. 1 is a diagram of a communications network consistent with the principles of the present invention.

FIG. 1 is a block diagram of a communications network consistent with the principles of the present invention. Network Call Center (NCC) 1100 connects customer 1200 to agent 1300 of a virtual team of agents. A single customer and a single agent have been shown for simplicity. The number of customers and agents is not important.

Customer 1200 uses a conventional telephone 1210 to communicate with an agent in a virtual agent team through NCC 1100 using Public Switched Telephone Network (PSTN) 1400. Switch 1220 is a standard PBX or Class 5 telephone switch, and connects customer 1200 to NCC 1100 over a standard telephone line.

To service customer calls, agent 1300 uses terminal 1310 to connect to NCC 1100. Agent terminal 1310 is a personal computer with Voice over Internet Protocol (VoIP) capability provided by software and multimedia components or a hardware and software combination, such as a VoIP card. The VoIP card may be any conventional voice over Internet card, such as those manufactured by Northern Telecom, Ltd., that converts voice to data and data to voice for transmitting voice signals over a data network, such as the Internet.

Agent terminal 1310 connects to NCC 1100 via switch 1320 and data network 1500. Switch 1320 is a standard PBX or Class 5 telephone switch with a standard connection to PSTN 1400.

Data network 1500 may be provided by a public Internet Service Provider (ISP), or a private Intranet. Data network 1500 may be a local network, in which case all data connections are local. Alternatively, data network 1500 may utilize Wide Area Network (WAN) technology. This would permit the endpoints of the data connection to be located anywhere.

As FIG. 1 shows, agent terminal 1310 may connect to data network 1500 via PSTN 1400. In this case, both agent terminal 1310 and data network 1500 contain modems to convert data to and from the serial form used for transmission over PSTN 1400. Alternatively, private facilities may be used to connect agent terminal 1310 to data network 1500.

Agent terminal 1310 also connects to a host computer, such as host computer 1600, or multiple host computers via data network 1500. Host computer 1600 provides agent 1300 with data, including, for example, customer records, reservation information, and catalogue ordering information. Host computer 1600 also drives initial presentation screens on agent terminal 1310.

NCC 1100 controls the routing of calls from customer 1200 to agent 1300, and preferably includes High Level Switch (HLS) 1110, ACD server 1120, Interactive Voice Response unit (IVR) 1130, and Voice over Internet Protocol (VoIP) server 1140.

HLS 1110 is a network switch, such as a DMS Traffic Operator Position System (TOPS) switch manufactured by Northern Telecom, Ltd. HLS 1110 receives calls from customer 1200 for service by an agent, and preferably contains an interface to permit ACD server 1120 to control call routing.

ACD server 1120 includes a computer with an Ethernet or Ethernet-equivalent data connection to HLS 1110, IVR 1130, VoIP server 1140, and data network 1500. ACD server 1120 preferably includes an IBM-compatible computer executing Windows NT™, but might include a UNIX™-capable computer, such as an HP model, the IBM Risc 6000, or any other equivalent processor.

ACD server 1120 queues customer calls and controls the routing of the calls to agents over data network 1500. ACD server 1120 also records information regarding the availability of agents, controls the operation of IVR 1130 and VoIP server 1140, and provides Management Information System (MIS) data.

Figure 2:
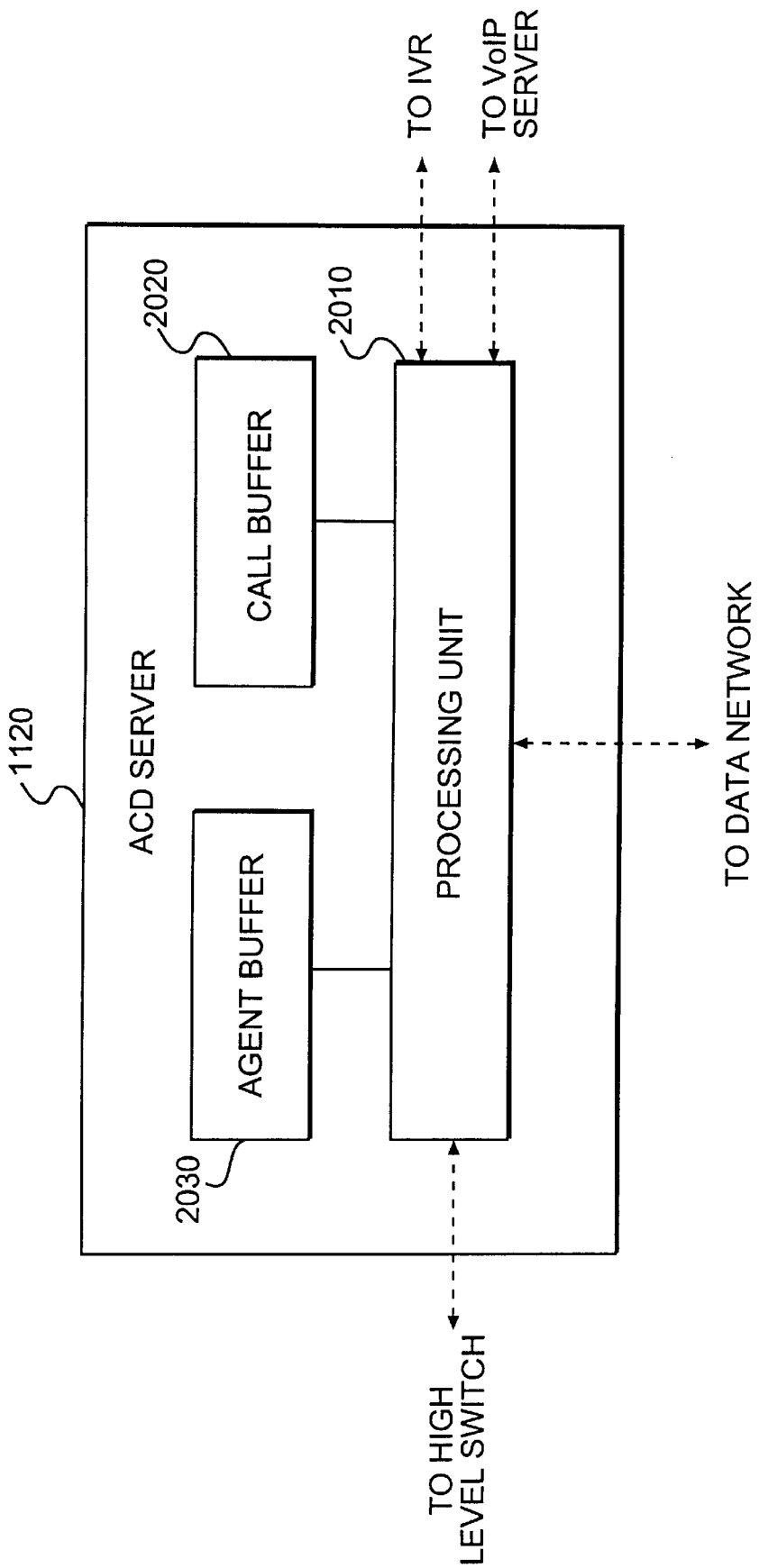
FIG. 2 is a diagram of the components comprising the ACD server of FIG. 1.

FIG. 2 is a block diagram of the components of ACD server 1120, including processing unit 2010, call buffer 2020, and agent buffer 2030. Processing unit 2010 tracks agent availability and handles the processing of customer calls, including the queuing of such calls in call buffer 2020 and the routing of these calls to available agents.

Call buffer 2020 preferably includes several call queues arranged by categories, such as by agent team, or by customer call criteria, such as the desired language of the customer. The call queues may also contain priority call queues for faster service by the agents. A call may be placed in a priority call queue, for example, after it has waited in call buffer 2020 longer than a predetermined period of time.

Agent buffer 2030 preferably contains several agent queues. The agent queues can be arranged, for example, by agent team. Each agent queue contains values representing idle agents waiting for a call to service. Similar to the call queues, the agent queues may contain priority agent queues that are searched first when a new call arrives needing service.

Both the queues of calls in call buffer 2020 and the queues of available agents in agent buffer 2030 that agents service are predetermined by the call center service provider or by the operating telephone company on behalf of the call center service provider. Agents may need to service multiple queues or just one queue. Agents may also need to service different queues at different priorities.

Returning to FIG. 1, IVR 1130 includes a computer, such as a personal computer or a larger mainframe computer, with a voice connection to HLS 1110. IVR 1130 collects information from the customers to aid ACD server 1120 in categorizing the customer calls, storing them in a proper call queue in ACD server 1120, and directing them to an appropriate agent. IVR 1130 plays announcements or music for the customers while awaiting service in a call queue.

VoIP server 1140 includes a computer with a voice connection to HLS 1110 and an Ethernet-equivalent data connection to ACD server 1120 and data network 1500. VoIP server 1140 includes a collection of VoIP cards, or equivalent software and multimedia components, to convert voice to data and data to voice for transmitting voice signals over data network 1500. The VoIP cards may be any conventional voice over Internet cards.

II. Processing.

Figure 3:
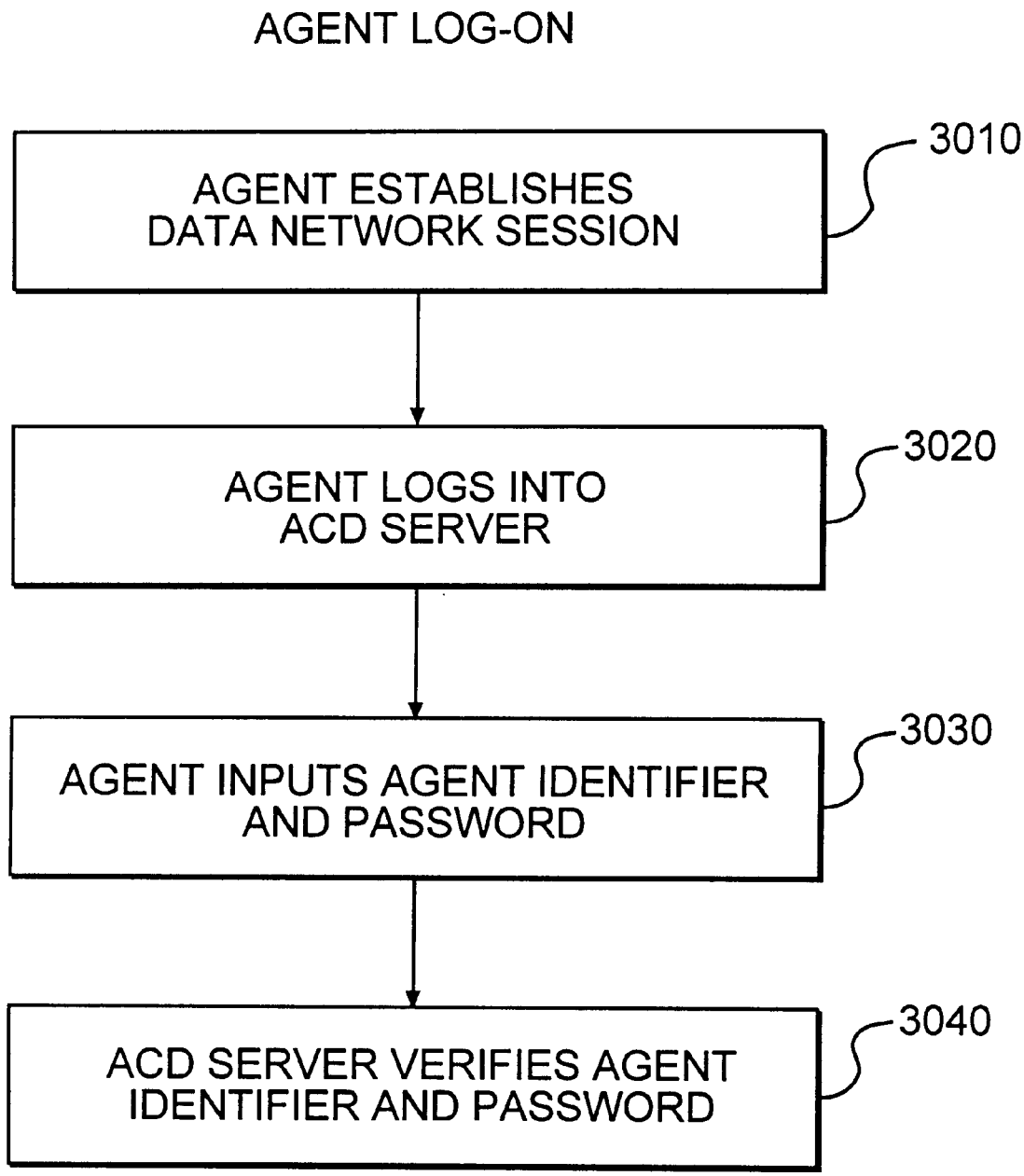
FIG. 3 is a flowchart of agent log-on activity consistent with the principles of the present invention.
Figure 4:
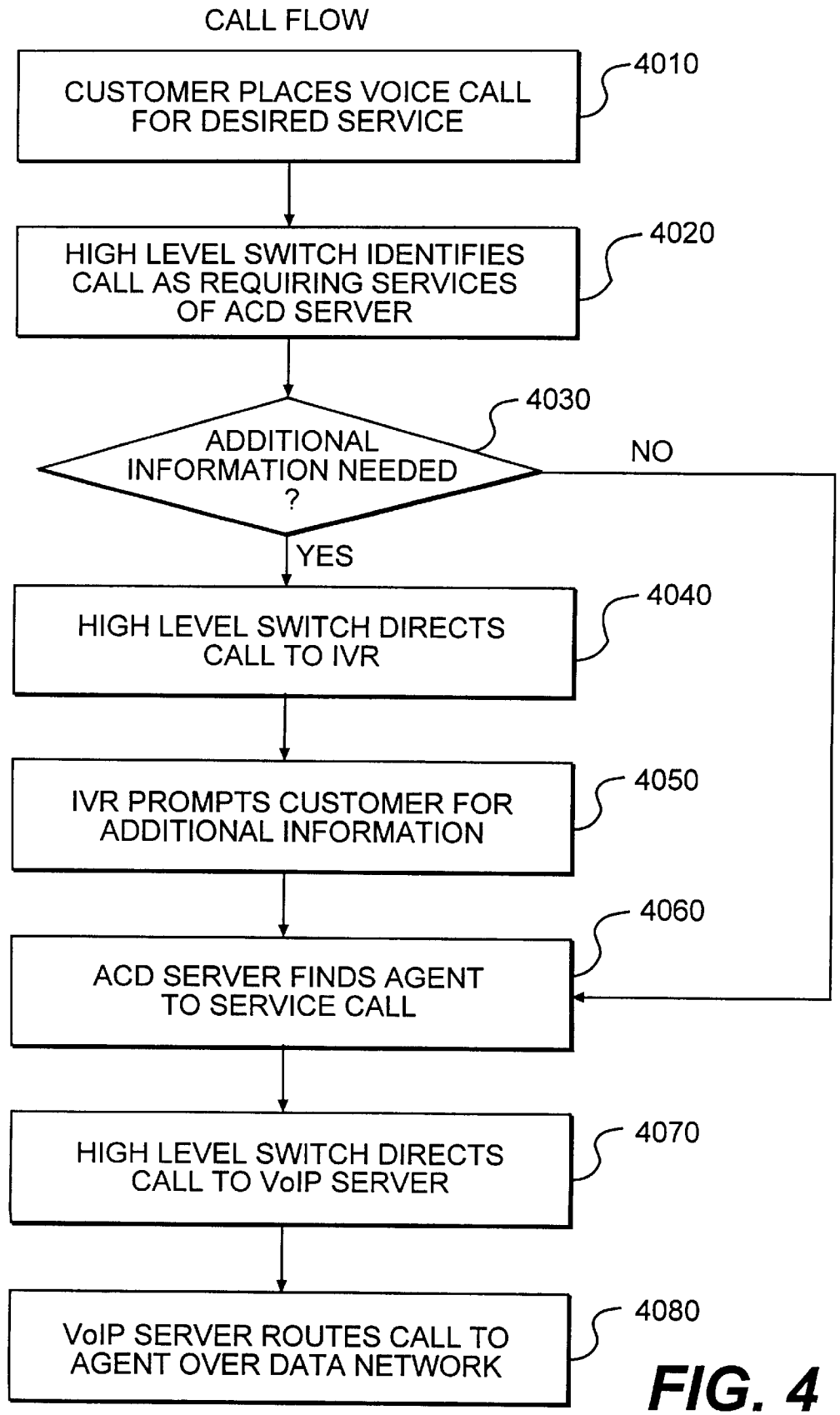
FIG. 4 is a flowchart of call flow activity consistent with the principles of the present invention.
Figure 5:
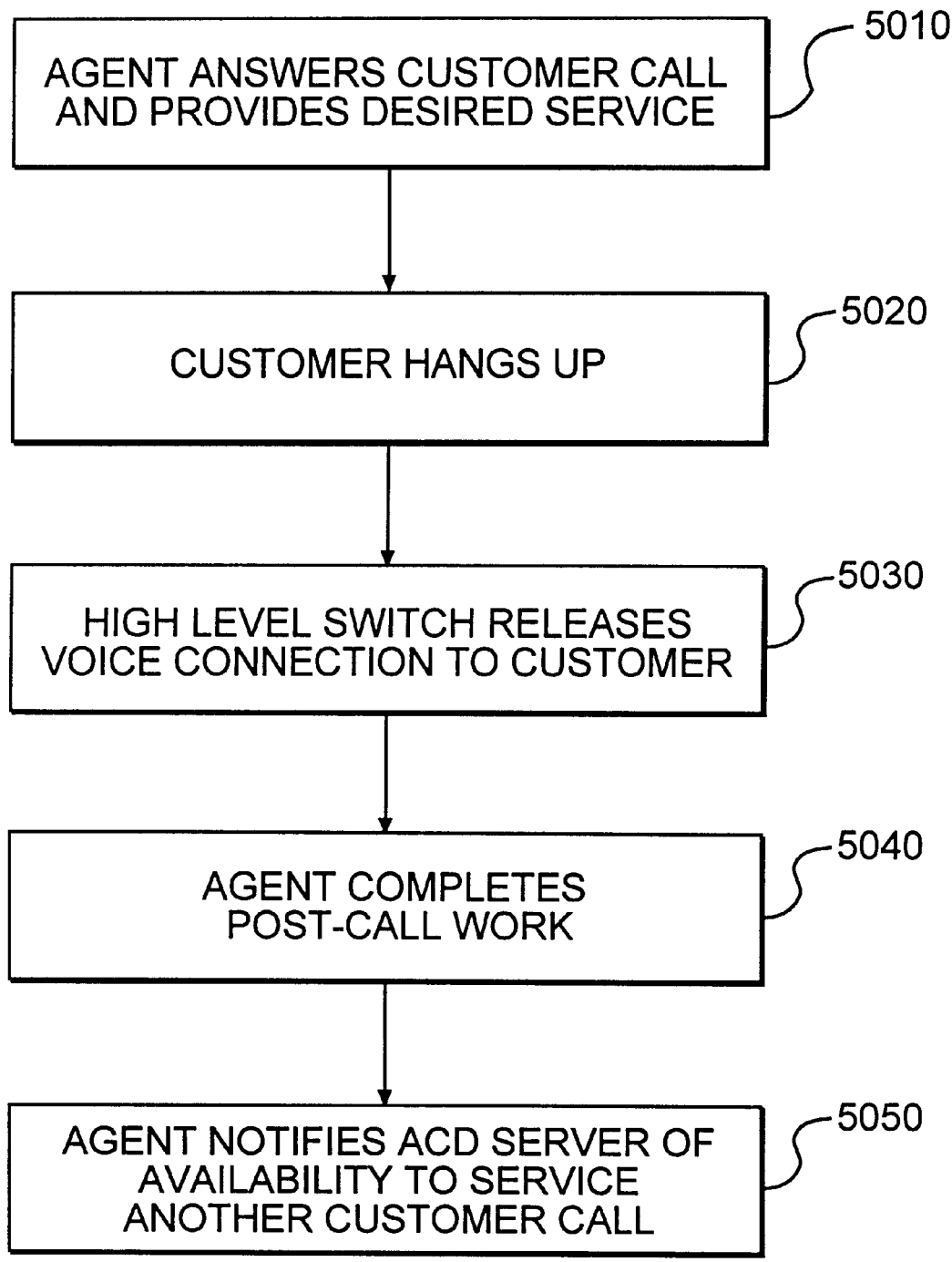
FIG. 5 is a flowchart of agent service activity consistent with the principles of the present invention.

FIGS. 3–5 are flowcharts illustrating the operation of the network call center consistent with the principles of the present invention. FIG. 3 is a flowchart of agent log-on activity, consistent with the principles of the present invention, that occurs when an agent, such as agent 1300 in FIG. 1, wants to service customer calls. Agent 1300 establishes a data network session with data network 1500 by dialing a predetermined telephone number associated with data network 1500, using, for example, a modem [step 3010]. Agent terminal 1310 maintains the data network session until such time as agent 1300 indicates a desire to no longer service customer calls.

Once agent 1300 establishes the data network session, agent 1300 logs into ACD server 1120 by conventional methods [step 3020]. ACD server 1120 prompts agent 1300 to enter an agent identifier and a password [step 3030]. ACD server 1120 then verifies the agent identifier and password to ensure that only authorized agents are permitted to log in [step 3040]. Based on the agent identifier, ACD server 1120 updates internal records indicating the skills that agent 1300 has and the queues that agent 1300 can serve.

After successfully logging in, agent 1300 awaits a customer call. FIG. 4 is a flowchart of call flow activity consistent with the principles of the present invention. A customer, such as customer 1200, places a voice call for a desired service, such as to make a reservation or to order a product [step 4010]. To place the voice call, customer 1200 dials a telephone number, typically a toll-free number or a local number, for the desired service.

Switch 1220 routes customer 1200's call to NCC 1100 through PSTN 1400. If customer 1200 dialed a local telephone number for the desired service, switch 1220 performs translations using Local Number Portability techniques, described in copending application Ser. No. 08/982,501, (Atty. Docket No. 3384.0060-04), to route the call to NCC 1100.

HLS 1110 receives the call and, from detecting the telephone number customer 1200 dialed, identifies it as a call requiring the services of ACD server 1120 [step 4020]. HLS 1110 then sends ACD server 1120 call information, including the calling and called telephone numbers, corresponding to the call. At this point, ACD server 1120 may desire to collect additional information from customer 1200 [step 4030]. The criteria for collecting additional information is preferably preestablished. For example, ACD server 1120 might always desire to collect additional information or might desire to collect additional information only from customers who have not previously called for the particular service.

If ACD server 1120 desires additional information from customer 1200, ACD server 1120 instructs HLS 1110 to connect customer 1200's call to IVR 1130 [step 4040]. Once HLS 1110 connects customer 1200's call to IVR 1130, ACD server 1120 instructs IVR 1130 to prompt customer 1200 for the desired information [step 4050]. Using this information, ACD server 1120 finds from the agent queues the next available agent with the necessary skills to service customer 1200 [step 4060].

Once ACD server 1120 selects the appropriate agent, for our example, agent 1300, ACD server 1120 instructs HLS 1110 to direct the call to VoIP server 1140 [step 4070]. ACD server 1120 then instructs VoIP server 1140 to route the call to agent 1300, using agent 1300's Internet address. VoIP server 1140 converts the voice signals of the call to digital data and transmits the digital data to agent 1300 over data network 1500 to allow customer 1200 to communicate with agent 1300 over data network 1500 [step 4080].

If ACD server 1120 does not need additional information from customer 1200 [step 4030], ACD server 1120 uses the information it has regarding customer 1200 to find from the agent queues the next available agent, again agent 1300, with the necessary skills to service customer 1200 [step 4060]. Once ACD server 1120 selects agent 1300, ACD server 1120 instructs HLS 1110 to direct the call to VoIP server 1140 [step 4070]. ACD server 1120 then instructs VoIP server 1140 to route the call to agent 1300 using agent 1300's Internet address. VoIP 1140 converts the voice signals of the call to digital data and transmits the digital data to agent 1300 over data network 1500 [step 4080].

At the same time that ACD server 1120 sets up the data network voice connection, ACD server 1120 transmits call context data to host computer 1600. Host computer 1600 uses the call context data to the drive initial screen presentations to agent 1300 on agent terminal 1310, so that agent 1300 can become aware of the information collected by ACD server 1120 regarding customer 1200.

Once agent 1300 receives the call, agent service activity shown in the flowchart of FIG. 5 occurs. Agent terminal 1310 receives the digital data from VoIP server 1140 and converts it back into voice signals to permit agent 1300 to answer customer 1200's call and provide the desired service [step 5010]. During call servicing, agent terminal 1310 communicates with up to three different computers: VoIP server 1140, ACD server 1120, and host computer 1600. All three computers communicate by sending messages to the single Internet address corresponding to agent terminal 1310.

This communication is managed by the use of data connections, such as conventional Transaction Control Protocol/Internet Protocol (TCP/IP) sockets or Universal Datagram Protocol/Internet Protocol (UDP/IP) packets. A packet stream is used, for example, to route customer 1200's voice through data network 1500. A data socket may be used to route call context information from host computer 1600 to agent terminal 1310.

Once agent 1300 completes the service interaction, customer 1200 hangs up (places customer telephone 1210 on-hook) [step 5020]. Switch 1220 detects the on-hook state of customer telephone 1210 and reports the on-hook state to HLS 1110 through PSTN 1400. HLS 1110, in turn, reports the on-hook state to ACD server 1120. In response, ACD server 1120 instructs HLS 1110 to release the voice connection to customer 1200, if HLS 1110 has not already done so [step 5030].

After customer 1200 goes on-hook, agent 1300 performs any required post-call work [step 5040]. After finishing, agent 1300 notifies ACD server 1120 by conventional methods of the availability to service another customer call [step 5050].

At some point, agent 1300 may want to discontinue servicing customer calls. In this case, agent 1300 sends a message to ACD server 1120 indicating the desire to log-off. In response, ACD server 1120 updates its records accordingly, performs any necessary MIS functions, and ends the data network session with agent 1300.

III. Conclusion.

The systems and methods consistent with the principles of the present invention permit agents, whose physical location is immaterial, to service customer calls through a data network, using a standard telephone line and without requiring agents to connect through a PBX.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

Although a network level switch has been described as providing the call management functionality, this need not be the case. The call management functionality might alternatively be provided by a local switch. Furthermore, the ACD server has been described as containing the customer and agent queues. However, the high level switch might alternatively provide this queuing.

In addition, if the data network is a local data network, then the VoIP server may be located in the data network. In this case, the VoIP server may include modems for facilitating connections by agents dialing up access to the data network. Alternatively, the VoIP cards may be combined with the trunk technology of the network telephone switches.

Also, in the case where the agent terminal connects to multiple host computers, the ACD server may drive the initial presentation screens on the agent terminal, instead of the host computers.

What is claimed is:

1. A call servicing system comprising:
   a plurality of customer switches configured to direct calls to and from customers;
   a plurality of agent terminals for use by service agents and connected via at least one of a plurality of local switches without Automatic Call Distribution (ACD) functionality;
   network switching means, connected to the customer switches, for receiving a call from one of the customers;

call transferring means, connected to the network switching means and to the agent terminals via a data network, for routing the call to the service agents; and Automatic Call Distribution (ACD) server means, connected to the network switching means, the call transferring means, and the agent terminals via the data network, including means for selecting one of the service agents who can service the call, and means for controlling the call transferring means to forward, via the data network, the call to one of the agent terminals associated with the selected service agent.

2. The system of claim 1, wherein the controlling means includes means for sending a data network address corresponding to the selected service agent to the call transferring means.

3. The system of claim 2, wherein the call transferring means includes means for routing the call to the selected service agent over the data network, using the data network address.

4. The system of claim 1, wherein the call transferring means includes means for converting voice signals included in the call to digital data, and means for transmitting the digital data to the agent terminal.

5. The system of claim 1, wherein the data network is an Internet or Internet-equivalent data network; and wherein the agent terminals, the ACD server means, and the call transferring means include an Internet or Internet-equivalent communications interface.

6. A method for managing calls at a network call center having a network switch connected to an Automatic Call Distribution (ACD) server, the network call center connecting to at least one of a plurality of agent terminals via at least one of a plurality of local agent switches without ACD functionality, comprising the steps of:

receiving a call from a customer requesting service;

selecting a service agent who can process the call;

converting a form of the call to facilitate transmission of the call over a data network; and transmitting the converted call to the selected service agent via the data network.

7. The method of claim 6, further comprising the step of detecting call information from the call, and wherein the selecting step includes the substep of finding a service agent based on the detected call information.

8. The method of claim 6, wherein the transmitting step includes the substeps of determining a data network address corresponding to the selected service agent, and sending the call to the selected service agent over the data network using the data network address.

9. The method of claim 6, wherein the converting step includes the substeps of converting voice signals of the call to digital data, and transmitting the digital data to the selected service agent over the data network.

10. The method of claim 9, wherein the converting step further includes the substeps of converting digital data representing voice signals from the selected service agent to voice signals, and transmitting the voice signals to the customer.

11. The method of claim 6, wherein the converting step includes the substeps of converting digital data representing voice signals from the selected service agent to voice signals, and transmitting the voice signals to the customer.

12. The method of claim 6, wherein the data network is an Internet-equivalent data network, and the converting step includes the substeps of translating voice signals of the customer call to digital data, and transmitting the digital data to the selected service agent over the Internet-equivalent data network.

13. A method of facilitating servicing of telephone calls from customers by agents connected to a network call center having a network switch connected to an Automatic Call Distribution (ACD) server, the network call center connecting to at least one of a plurality of agent terminals via at least one of a plurality of local agent switches without ACD functionality and a data network, comprising the steps, executed by each of the agent terminals, of:

establishing a communication session with the network call center over the data network;

receiving, from the network call center over the data network, data representing a telephone call from a customer requesting service; and translating a form of the data to facilitate servicing of the telephone call by an agent.

14. The method of claim 13, wherein the establishing step includes the substeps of establishing a data session with the data network, and logging into the network call center.

15. The method of claim 14, wherein the logging in step includes the substeps of transmitting an agent identifier and password to the network call center, and receiving verification of a successful log-on from the network call center.

16. The method of claim 13, wherein the translating step includes the substeps of receiving digital data representing voice signals of the telephone call from the network call center over the data network, and converting the digital data to voice signals for presentation to the agent.

17. The method of claim 13, wherein the data network is an Internet-equivalent data network, and the translating step includes the substeps of receiving digital data representing voice signals of the telephone call from the network call center over the Internet-equivalent data network, and converting the digital data to voice signals for presentation to the agent.

18. The method of claim 17, wherein the translating step further includes the substeps of translating voice signals from the agent into digital data, and transmitting the digital data to the network call center over the Internet-equivalent data network.

19. A network call center having a network switch connected to an Automatic Call Distribution (ACD) server, the network call center connecting to at least one of a plurality of agent terminals via at least one of a plurality of local agent switches without ACD functionality, for managing service calls from customers communicating via customer switches to service agents communicating via a data network, comprising:

a network switch connected to the customer switches via standard telephone lines, and configured to receive the service calls from the customers;

a voice translation server connected to the network switch and the data network, and configured to route the service calls to the service agents; and an Automatic Call Distribution (ACD) server connected to the network switch, the voice translation server, and the data network, and configured to select service agents to handle the service calls, and to control the voice translation server to route the service calls to the service agents via the data network.

20. In a network for routing calls from customers communicating via customer switches to service agents using at least one of a plurality of agent terminals, which is connected to at least one of a plurality of local agent switches without Automatic Call Distribution (ACD) functionality communicating via a data network, an ACD server controlling a network switch coupled to the customer switches and a translation unit coupled to the data network, the ACD server comprising:

means for receiving call information from the network switch, the call information being information detected by the network switch regarding a call received from one of the customers;

means for selecting one of the service agents who can service the call;

means for determining a data network address corresponding to the selected service agent; and means for instructing the translation unit to transmit the call to the selected service agent over the data network using the data network address.

21. A method for routing calls from customers communicating via customer switches to service agents using at least one of a plurality of agent terminals, which is connected to at least one of a plurality of local agent switches without Automatic Call Distribution (ACD) functionality communicating via a data network, an ACD server controlling a network switch coupled to the customer switches and a translation unit coupled to the data network, the method executed by the ACD server comprising the steps of:

receiving, from the network switch, call information detected by the network switch regarding a call received from one of the customers;

selecting one of the service agents who can service the call;

determining a data network address corresponding to the selected service agent; and instructing the translation unit to transmit the call to the selected service agent over the data network using the data network address.

22. In a network for routing calls from customers communicating via customer switches to service agents using at least one of a plurality of agent terminals, which is connected to at least one of a plurality of local agent switches without Automatic Call Distribution (ACD) functionality communicating via a data network, a translation unit being coupled to an ACD server, a network switch coupled to the customer switches, and the data network, the translation unit comprising:

means for receiving a call requesting service by one of the customers from the network switch;

means for converting voice signals of the call to digital data;

means for receiving a data network address corresponding to a selected one of the service agents from the ACD server; and means for transmitting the digital data to the selected service agent over the data network using the data network address.

23. A method for routing calls from customers communicating via customer switches to service agents using at least one of a plurality of agent terminals, which is connected to at least one of plurality of local agent switches without Automatic Call Distribution (ACD) functionality communicating via a data network, a translation unit being coupled to an ACD server, a network switch coupled to the customer switches, and the data network, the method executed by the translation unit comprising the steps of:

receiving a call requesting service by one of the customers from the network switch;

converting voice signals of the call to digital data;

receiving a data network address corresponding to a selected one of the service agents from the ACD server; and transmitting the digital data to the selected service agent over the data network using the data network address.

* * * * *